United States Patent [19]

White et al.

[11] Patent Number: 5,760,171

[45] Date of Patent: Jun. 2, 1998

[54] METHOD FOR DECOLORIZING POLYPHENYLENE ETHER RESINS

[75] Inventors: Dwain Montgomery White; Gary William Yeager, both of Schnectady, N.Y.

[73] Assignee: General Electric Company, Schenectady, N.Y.

[21] Appl. No.: 788,666

[22] Filed: Jan. 24, 1997

Related U.S. Application Data

[63] Continuation-in-part of Ser. No. 689,122, Jul. 30, 1996, abandoned.

[51] Int. Cl.⁶ ............................................. C08F 6/00
[52] U.S. Cl. ................... 528/495; 528/212; 528/218; 528/219; 525/132; 525/152; 525/534; 524/292; 524/323; 524/346; 524/347; 524/348

[58] Field of Search ...................... 528/495, 212, 528/218, 219; 525/132, 152, 534; 524/292, 323, 346, 347, 348

[56] References Cited

U.S. PATENT DOCUMENTS 4,060,514  11/1977  White.
4,695,601   9/1987  Halpern.

*Primary Examiner*—Duc Truong
*Attorney, Agent, or Firm*—William H. Pittman; Noreen C. Johnson

[57] ABSTRACT

Polyphenylene ethers are decolorized by contact in the melt or in solution with a hydroxy compound containing either another hydroxy group or a double or aromatic bond in a specific location in the molecule. Illustrative decolorizing compounds are benzopinacol, benzoin and acetoin.

10 Claims, No Drawings

METHOD FOR DECOLORIZING POLYPHENYLENE ETHER RESINS

This application is a continuation-in-part of application Ser. No. 08/689,122, filed Jul. 30, 1996, now abandoned.

BACKGROUND OF THE INVENTION

This invention relates to polyphenylene ether resins, and more particularly to the decolorization and/or suppression of color formation therein.

Polyphenylene ethers are an extremely useful class of engineering thermoplastics by reason of their hydrolytic stability, dimensional stability, toughness, heat resistance and dielectric properties. They are typically prepared by oxidative coupling of substituted phenols such as 2,6-xylenol with the use of a catalyst system comprising a combined metal such as copper, manganese or cobalt and various organic compounds such as amines and benzoin oximes.

One method of preparation and workup, hereinafter sometimes designated "precipitation", involves the use of an organic solvent, typically toluene, from which the resin is precipitated after formation, whereupon it is washed with methanol and dried. In another workup method, hereinafter sometimes designated "direct isolation", by-product water and catalyst are removed from the toluene solution, typically by liquid-liquid centrifugation, followed by a further water wash and stripping of the toluene.

It is frequently found that polyphenylene ethers have a pronounced color. The intensity of this color may be measured in terms of yellowness index, a known parameter disclosed in many patents, or in terms of color number, which is the sum of the resin absorbances at 405, 420 and 435 nm divided by the concentration in g/100 ml of a chloroform solution of the resin.

The actual color number of the product depends to some extent on its method of preparation. For example, a polyphenylene ether prepared using a copper catalyst system that contains a diamine such as N,N'-di-t-butylethylenediamine (hereinafter "DBEDA"), a tertiary amine such as dimethyl-n-butylamine and a secondary monoamine such as di-n-butylamine (hereinafter "DBA") has been found to contain aminoalkyl-substituted alkyl substituent groups, particularly on the end groups at the head of the polymer chain, as well as substituted biphenyl end groups on the tail of said chain. The latter are the result of equilibration into the polymer chain of the side product 3,3',5,5'-tetramethyl-3,3'-diphenoquinone (TMDQ). Resins of this type frequently have color numbers of about 10 after precipitation and drying, but the color number may increase to about 30 upon melt processing.

The color number may be higher, typically in the range of about 50–250, for a resin precipitated from a catalyst system in which N,N,N',N'-tetraethylethylenediamine (hereinafter "TEEDA") is substituted for the DBEDA or from which secondary monoamines such as DBA are absent. Resins prepared using a manganese chloride-benzoin oxime catalyst and precipitated may have color numbers on the order of 50–100, unless a secondary monoamine such as DBA is present whereupon the color number may be as low as about 30–50.

Resins prepared by direct isolation are typically of much higher color, by reason of the presence of colored impurities which are not removed during workup. In addition, increases in molecular weight are common in such resins, probably as a result of intercondensation of polymer molecules through the aminoalkyl-substituted end groups.

U.S. Pat. No. 4,060,514 describes the decolorization of polyphenylene ethers by treatment with a dithionite or thiosulfate in combination with a phase transfer catalyst. However, the method has been found to be reliably applicable only with resins in solution in various organic solvents.

It would be desirable to decrease the color number of polyphenylene ether resins by a substantial amount during melt processing. Decreased color would maximize the utility of the resin in various applications in which color is undesirable. It would also be desirable to minimize molecular weight increase during direct isolation.

SUMMARY OF THE INVENTION

The present invention provides a method of decolorizing or suppressing color in polyphenylene ethers by treatment with various compounds which apparently serve as very mild reducing agents for colored impurities. The result is generally a substantial reduction in the color index of the resin.

One aspect of the invention is a method for decolorizing a polyphenylene ether which comprises mixing it in the melt or in solution with a decolorizing amount of at least one hydroxy compound having the formula

wherein:
each of $R^1$ and $R^2$ is hydrogen or a $C_{1-4}$ alkyl or $C_{6-10}$ aryl radical,
X is

Z is at least one moiety linked to C by an aliphatic double bond or an aromatic bond, and
each of $R^3$ and $R^4$ is hydrogen or a $C_{1-4}$ alkyl or $C_{6-10}$ aryl radical.

Another aspect is a composition comprising a polyphenylene ether and a minor decolorizing proportion of a hydroxy compound of formula I.

DETAILED DESCRIPTION; PREFERRED EMBODIMENTS

The polyphenylene ethers employed according to the present invention comprise a plurality of structural units of the formula

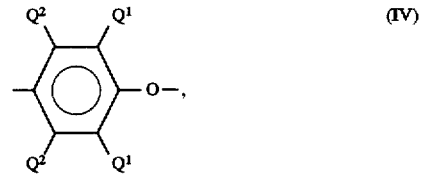

wherein in each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1, 4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

The polyphenylene ether preferably has an intrinsic viscosity greater than about 0.1, most often in the range of about 0.1–0.6 and especially 0.4–0.6 dl./g., as measured in chloroform at 25° C.

As previously mentioned, the polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

The polyphenylene ethers include those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system, and becomes incorporated into the polyphenylene ether chain through equilibration. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers which may be decolorized by the present invention include all those presently known, irrespective of variations in structural units or ancillary chemical features.

According to the present invention, the polyphenylene ether is treated in the melt or in solution with at least one hydroxy compound having formula I. The $R^1$ radicals in that formula may be alkyl or aryl radicals, preferably methyl or phenyl.

The X radical may have formula II or III. In formula III, $R^3$ and $R^4$ are alkyl or aryl radicals similar to $R^2$ and $R^3$, with the same preferences.

In formula II, the radical —CZ may be any acyclic or cyclic radical in which at least one moiety is linked to the depicted carbon atom by an aliphatic double bond or an aromatic bond. Suitable double bonds include carbon-carbon and carbon-oxygen bonds. Also useful are compounds containing aromatic bonds of the type present in a benzene ring or the like.

Among the hydroxy compounds useful as decolorizing agents according to the invention are the following:

benzopinacol (1,1,2,2-tetraphenylethane-1,2-diol)
benzoin (2-hydroxy-1,2-diphenylethanone)
acetoin (3-hydroxy-2-butanone)
allyl alcohol
acetol (1-hydroxy-2-propanone)
2-butene-1,4-diol
benzyl alcohol
hydrobenzoin (1,2-diphenylethane-1,2-diol)
benzhydrol (diphenylmethanol)
methylphenylcarbinol (1-phenylethanol) pinacol (2,3-dimethyl-2,3-dihydroxybutane)
2,3-diphenylbutane-2,3-diol.

According to the invention, the hydroxy compound is contacted with the polyphenylene ether in the melt or in solution in an organic solvent, most often an aromatic solvent such as toluene. Contact is typically at temperatures in the range of about 0°–350° C., with about 200°–350° C. being preferred for melt contact and about 20°–50° C. for contact in solution. Conventional blending procedures may be employed, including batch processing and continuous operations such as extrusion. The melt method is often particularly effective under extrusion conditions with vacuum venting.

The proportion of hydroxy compound is an effective amount to decolorize the resin, which may be determined by simple experimentation and which may vary somewhat from one decolorizing agent to another; typical amounts are in the range of about 0.2–50 and preferably about 0.5–15 phr (parts by weight per 100 parts of polyphenylene ether.

It is within the scope of the invention to employ the polyphenylene ether in admixture with various other materials, notably resins such as polystyrene (both crystal and high impact), olefin polymers, polyamides, polyesters and polyarylene sulfides. Such resin mixtures may be uncompatibilized or compatibilized by art-recognized methods, and may be treated according to the invention in the melt or in solution. Graft and block copolymers and mixtures of polymers with conventional additives may also be employed.

The compositions of this invention comprise a polyphenylene ether and the hydroxy compound. Such compositions may be already blended or may be simple physical mixtures to be subsequently blended.

The method of the invention is illustrated by a series of examples. Unless otherwise specified, the following poly(2, 6-dimethyl-1,4-phenylene) ethers ("PPE") were employed:

"Cu/DBEDA"—prepared by the use of a copper halide/ DBEDA/DBA/dimethyl-n-butylamine catalyst, polymer intrinsic viscosity (in chloroform at 25° C.) 0.46 dl/g.

"Cu/TEEDA"—prepared with a copper halide/tetraethylethylenediamine (no DBA) catalyst.

"Mn/DBA"—prepared with a manganese halide/benzoin oxime/DBA catalyst, polymer intrinsic viscosity 0.47 dl/g.

"Mn"—prepared with a manganese halide/benzoin oxime (no DBA) catalyst, polymer intrinsic viscosity 0.41 dl/g.

EXAMPLE 1

The hydroxy compounds were either dry blended at 3 or 10 phr with 1 g of PPE synthesized by various methods, or were blended in the form of a 20% (by weight) solution in methanol after which the methanol was removed by vacuum stripping. The treated resins were compression molded to films at 270° C. and 909 kg. A weighed sample of each film was then dissolved in chloroform at 2%, or 1% when very dark, and the color numbers were spectrophotometrically determined. The results are given in Table I.

TABLE I

| PPE | Decolorizing agent | Color number | |
|---|---|---|---|
| | | 3 phr | 10 phr |
| Cu/DBEDA | None | 25 | 25 |
| " | Benzoin | 11.6 | 10.3 |
| " | Acetoin | 11.6 | 10.5 |
| " | Acetol | 14.5 | — |
| " | Benzopinacol | 15 | 17.5 |
| " | Allyl alcohol | 15.3 | 17.6 |
| " | 2-Butene-1,4-diol | 15.6 | 8.3 |
| " | Benzyl alcohol | 17.6 | 12.5 |
| " | Hydrobenzoin | 17.8 | 14.7 |
| " | Benzhydrol | 18 | 13 |
| " | Methylphenylcarbinol | 19 | 11.5 |
| " | Pinacol | 23 | 18 |
| " | 2,3-Diphenylbutane-2,3-diol | 23.5 | 21 |
| Cu/TEEDA | None | 72 | 72 |
| " | Benzopinacol | — | 53 |
| " | 2,3-Diphenylbutane-2,3-diol | 51 | — |
| " | Pinacol | 66 | 54 |
| " | Hydrobenzoin | — | 42 |
| " | Benzhydrol | — | 59 |
| " | Methylphenylcarbinol | 59 | — |
| " | Benzyl alcohol | — | 46 |
| Mn/DBA | None | — | 37 |
| " | Benzopinacol | — | 29 |
| Mn | None | — | 82 |
| " | Benzopinacol | — | 42 |

It is apparent from the results in Table I that the method of this invention is effective to reduce the color of polyphenylene ether resins. In certain cases, such as the entries for pinacol and 2,3-diphenyl-2,3-butanediol with Cu/DBEDA PPE, a substantial decolorization effect is shown only at higher levels of decolorizing agent.

EXAMPLE 2

The hydroxy compounds were dry blended with 200 mg of PPE and the mixtures were degassed and placed in a nitrogen atmosphere in a glass tube, which was then heated with an aluminum block maintained at 300° C. Total heating time was 5 minutes, equivalent to about 1 minutes at 300° C. The color numbers were then determined and the results are listed in Table II.

TABLE II

| PPE | Decolorizing agent | | Color number |
|---|---|---|---|
| | Identity | Amount, phr | |
| Cu/DBEDA | None | — | 25 |
| " | Benzopinacol | 50 | 9 |
| Cu/TEEDA | None | — | 217 |
| " | Benzopinacol | 30 | 115 |
| " | " | 10 | 122 |
| " | " | 3 | 164 |

EXAMPLE 3

Mixtures of Cu/DBEDA PPE, various polystyrenes and various hydroxy compounds were extruded at temperatures in the range of about 300°–315° C. and pelletized. The color numbers were determined and compared with those for the neat PPE-polystyrene blends. The results are given in Table III.

TABLE III

| Other resin | | Decolorizing agent | | |
|---|---|---|---|---|
| Identity | Amount, % | Identity | Amount, phr | Color number |
| Crystal polystyrene | 5 | None | — | 17.2 |
| " | " | Benzoin | 1 | 12.1 |
| High impact polystyrene | 50 | None | — | 15.9 |
| " | " | Allyl alcohol | 0.5 | 13.0 |

EXAMPLE 4

Two poly-(2,6-dimethyl-1,4-phenylene ethers) of differing intrinsic viscosities were prepared in toluene solution at 20% (by weight) solids, using the Cu/DBEDA catalyst. After catalyst removal, the solutions were treated with benzoin at various weight percentage levels based on PPE, after which the toluene was stripped and the solid resins extruded on a twin screw extruder at 280° C., quenched in water and pelletized. Yellowness indices, intrinsic viscosities and molecular weights were determined, the latter by gel permeation chromatography relative to polystyrene.

The results are given in Table IV. The products of runs 1 and 6 were recovered by precipitation and the others by direct isolation.

TABLE IV

| Run | PPE intrinsic visc., dl/g | Benzoin % | Mn | MW | Intrinsic visc., dl/g | YI |
|---|---|---|---|---|---|---|
| 1 | 0.117 | 0.0 | 2,656 | 8,254 | 0.131 | 4.23 |
| 2 | 0.117 | 0.0 | 2,375 | 7,792 | 0.126 | 4.32 |
| 3 | 0.117 | 0.5 | 2,844 | 8,035 | 0.124 | 3.40 |
| 4 | 0.117 | 1.0 | 2,871 | 7,911 | 0.125 | 3.42 |
| 5 | 0.117 | 2.0 | 2,781 | 7,587 | 0.098 | 2.90 |
| 6 | 0.410 | 0.0 | 16,339 | 66,452 | 0.519 | 3.01 |
| 7 | 0.432 | 0.0 | 22,032 | 70,012 | 0.587 | 4.96 |
| 8 | 0.432 | 0.5 | 18,294 | 64,504 | 0.472 | 3.92 |
| 9 | 0.432 | 1.0 | 20,832 | 66,568 | 0.507 | 3.27 |
| 10 | 0.432 | 2.0 | 16,328 | 60,026 | 0.447 | 3.33 |

It is apparent from yellowness index values that color is effectively decreased according to the present invention when recovery is by direct isolation. It is also apparent that a substantially smaller increase in intrinsic viscosity (and hence molecular weight) was noted in the benzoin-treated runs than in the others. There is no indication that the molecular weight difference between the PPE employed in run 6 and that employed in runs 7–10 is responsible for these differences in properties, since said differences in properties are much greater than the differences in reactants.

What is claimed is:

1. A method for decolorizing a polyphenylene ether which comprises mixing it, in solution in an organic solvent at a temperature in the range of about 20°–50° C. with a decolorizing amount of at least one hydroxy compound having the formula

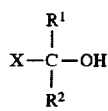

wherein:

each of $R^1$ and $R^2$ is hydrogen or a $C_{1-4}$ alkyl or $C_{6-10}$ aryl radical, X is −CZ or     (II)

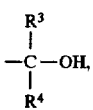

Z is at least one moiety linked to C by an aliphatic double bond or an aromatic bond, and each of $R^3$ and $R^4$ is hydrogen or a $C_{1-4}$ alkyl or $C_{6-10}$ aryl radical.

2. A method according to claim 1 wherein the polyphenylene ether is a poly(2,6-dimethyl-1,4-phenylene ether).

3. A method according to claim 2 wherein the organic solvent is toluene.

4. A method according to claim 2 wherein the polyphenylene ether is in admixture with another resin.

5. A method according to claim 4 wherein the other resin is a polystyrene or an olefin polymer.

6. A method according to claim 2 wherein the hydroxy compound is present in the amount of about 0.5–15 parts by weight per 100 parts of polyphenylene ether.

7. A method according to claim 2 wherein the hydroxy compound is benzopinacol.

8. A method according to claim 2 wherein the hydroxy compound is benzoin.

9. A method according to claim 2 wherein the hydroxy compound is acetoin, allyl alcohol, acetol, 2-butene-1,4-diol, benzyl alcohol or hydrobenzoin.

10. A method according to claim 2 wherein the hydroxy compound is benzhydrol, methylphenylcarbinol, pinacol or 2,3-diphenylbutane-2,3-diol.

* * * * *